(12) United States Patent
Yoshida et al.

(10) Patent No.: US 9,934,109 B2
(45) Date of Patent: Apr. 3, 2018

(54) INFORMATION PROCESSING APPARATUS, INFORMATION PROCESSING METHOD, AND PROGRAM

(71) Applicant: Sony Corporation, Tokyo (JP)

(72) Inventors: Kyosuke Yoshida, Kanagawa (JP); Takahiro Araki, Kanagawa (JP); Hisao Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 14/030,154

(22) Filed: Sep. 18, 2013

(65) Prior Publication Data

US 2014/0089267 A1  Mar. 27, 2014

(30) Foreign Application Priority Data

Sep. 25, 2012  (JP) .................................. 2012-210292

(51) Int. Cl.
*G06F 17/30* (2006.01)
*G06F 11/14* (2006.01)

(52) U.S. Cl.
CPC ...... *G06F 11/1469* (2013.01); *G06F 11/1435* (2013.01); *G06F 17/30067* (2013.01)

(58) Field of Classification Search
CPC ............. G06F 11/1451; G06F 11/1469; G06F 17/30188; G06F 17/30067
See application file for complete search history.

(56) References Cited

U.S. PATENT DOCUMENTS

| | | | | |
|---|---|---|---|---|
| 7,565,382 B1* | 7/2009 | Sobel | ................... | G06F 21/57 |
| 8,296,271 B1* | 10/2012 | Richardson | ......... | G06F 11/1469 |
| | | | | 707/640 |
| 2002/0064374 A1* | 5/2002 | Ando | ................... | G11B 27/034 |
| | | | | 386/241 |
| 2003/0163449 A1* | 8/2003 | Iwano | ................... | G06F 3/0601 |
| 2004/0177099 A1* | 9/2004 | Ganesh | ............... | G06F 11/1471 |
| 2006/0092794 A1* | 5/2006 | Takashima | ......... | G11B 20/1883 |
| | | | | 369/53.2 |
| 2006/0112311 A1* | 5/2006 | Cobb | ................... | G06F 9/4411 |
| | | | | 714/16 |
| 2007/0223521 A1* | 9/2007 | Teruyama | ............... | G06F 21/78 |
| | | | | 370/463 |
| 2008/0005111 A1* | 1/2008 | Savage | ............... | G06F 11/1474 |
| 2009/0003154 A1* | 1/2009 | Usui et al. | ................... | 369/47.1 |
| 2009/0300416 A1* | 12/2009 | Watanabe et al. | ............. | 714/19 |
| 2009/0327357 A1* | 12/2009 | Beglin | ............... | G06F 11/1435 |

(Continued)

FOREIGN PATENT DOCUMENTS

JP  2004-102660  4/2004

*Primary Examiner* — James Trujillo
*Assistant Examiner* — Jessica N Le
(74) *Attorney, Agent, or Firm* — Haug Partners LLP; William S. Frommer

(57) ABSTRACT

An information processing apparatus includes a search unit, a selection unit, and a mounting processor. The search unit is configured to search for a plurality of roll back points of a file system. The selection unit is configured to select, from the plurality of roll back points searched for by the search unit, a roll back point corresponding to an operation made by a user. The mounting processor is configured to mount the file system at the roll back point selected by the selection unit to a read-only state, and further mount the file system to a readable and writable state according to an operation made by the user.

7 Claims, 14 Drawing Sheets

(56) References Cited

U.S. PATENT DOCUMENTS

2010/0191783 A1* 7/2010 Mason et al. .............. 707/822
2012/0017114 A1* 1/2012 Timashev ........... G06F 11/1469
                                                                  714/15

* cited by examiner

| | BP | Length | Name | Contents |
|---|---|---|---|---|
| 1 | 0 | 16 | Descriptor Tag | tag (Tag=266) |
| 2 | 16 | 20 | ICB Tag | icbtag |
| 3 | 36 | 4 | Uid | Uint32 |
| 4 | 40 | 4 | Gid | Uint32 |
| 5 | 44 | 4 | Permissions | Uint32 |
| 6 | 48 | 2 | File Link Count | Uint16 |
| 7 | 50 | 1 | Record Format | Uint8 |
| 8 | 51 | 1 | Record Display Attributes | Uint8 |
| 9 | 52 | 4 | Record Length | Uint32 |
| 10 | 56 | 8 | Information Length | Uint64 |
| 11 | 64 | 8 | Object Size | Uint64 |
| 12 | 72 | 8 | Logical Blocks Recorded | Uint64 |
| 13 | 80 | 12 | Access Date and Time | timestamp |
| 14 | 92 | 12 | Modification Date and Time | timestamp |
| 15 | 104 | 12 | Creation Date and Time | timestamp |
| 16 | 116 | 12 | Attribute Date and Time | timestamp |
| 17 | 128 | 4 | Checkpoint | Uint32 |
| 18 | 132 | 4 | Reserved | #00 bytes |
| 19 | 136 | 16 | Extended Attribute ICB | long_ad |
| 20 | 152 | 16 | Stream Directory ICB | long_ad |
| 21 | 168 | 32 | Implementation Identifier | regid |
| 22 | 200 | 8 | Unique Id | Uint64 |
| 23 | 208 | 4 | Length of Extended Attributes (=L_EA) | Uint32=80 |
| 24 | 212 | 4 | Length of Allocation Descriptors (=L_AD) | Uint32 |
| 25 | 216 | L_EA=80 | Extended Attributes | bytes |
| 26 | [L_EA+216] | L_AD | Allocation descriptors | bytes |

FIG.14

INFORMATION PROCESSING APPARATUS, INFORMATION PROCESSING METHOD, AND PROGRAM

CROSS REFERENCE TO RELATED APPLICATIONS

This application claims the benefit of priority under 35 U.S.C. § 119 from Japanese Priority Patent Application JP 2012-210292 filed Sep. 25, 2012, the entire contents of each which is incorporated herein by reference.

BACKGROUND

The present disclosure relates to an information processing apparatus, an information processing method, and a program. In particular, the present disclosure relates to an information processing apparatus, an information processing method, and a program that are capable of rolling back a file system to a state desired by a user.

Japanese Patent Application Laid-open No. 2004-102660 (hereinafter, referred to as Patent Document 1) describes a system ensuring that a file system is securely maintained. If, particularly during updating or the like, a failure is generated in the file system and the updating processing Is interrupted in the middle, the integrity of the file system cannot be maintained. It becomes difficult to use the file system. In Patent Document 1, a roll back to a file system before the updating is ensured even in the case of such a failure.

SUMMARY

However, in the proposition described in Patent Document 1 above, a roll back point cannot be defined for each certain state of the file system. That is, a plurality of roll back points cannot be retained.

In view of the above-mentioned circumstances, it is desirable to roll back a file system to a state desired by a user.

According to an embodiment of the present disclosure, there is provided an information processing apparatus including a search unit configured to search for a plurality of roll back points of a file system, a selection unit configured to select, from the plurality of roll back points searched for by the search unit, a roll back point corresponding to an operation made by a user, and a mounting processor configured to mount the file system at the roll back point selected by the selection unit to a read-only state, and further mount the file system to a readable and writable state according to an operation made by the user.

The mounting processor may be configured to mount the file system at the roll back point selected by the selection unit to the read-only state, and further mount, if the selection unit selects another roll back point corresponding to an operation made by the user, the file system at the other roll back point selected by the selection unit to the read-only state.

The mounting processor may be configured to reconstruct, based on the management information of the file at the roll back point selected by the selection unit, management information of a file being currently referred to, to thereby mount the file system at the roll back point selected by the selection unit to the readable and writable state.

The search unit, may be configured to, sequentially from management information of a file being currently referred to, search for the roll back point based on information indicating a location of management information of an immediately previous file, the information being embedded in the management information of the file.

The file system is a UDF (Universal Disk Format).

According to another embodiment of the present disclosure, there is provided an information processing method for an information processing apparatus, the method including searching for a plurality of roll back points of a file system, selecting, from the plurality of roll back points searched for, a roll back point corresponding to an operation made by a user, and mounting the file system at the selected roll back point to a read-only state, and further mounting the file system to a readable and writable state according to an operation made by the user.

According to still another embodiment of the present disclosure, there is provided a program that causes a computer to function as a search unit configured to search for a plurality of roll back points of a file system, a selection unit configured to select, from the plurality of roll back points searched for by the search unit, a roll back point corresponding to an operation made by a user, and a mounting processor configured to mount the file system at the roll back point selected by the selection unit to a read-only state, and further mount the file system to a readable and writable state according to an operation made by the user.

According to the embodiment of the present disclosure, the plurality of roll back points of the file system are searched for and the roll back point corresponding to the operation of the user is selected from the plurality of roll back points searched for. Then, the file system at the selected roll back point is mounted to the read-only state and further mounted to the readable and writable state according to the operation made by the user.

According to the embodiments of the presentdisclosure, it is possible to roll back the file system to the state desired by the user.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 14 is a view explaining a method of embedding Previous Location information.

DETAILED DESCRIPTION OF EMBODIMENTS

Hereinafter, an embodiment for carrying out the present disclosure (hereinafter, referred to as embodiment) will be described.

[Configuration of Information Processing Apparatus According to Embodiment of Present Disclosure]

Figure 1:
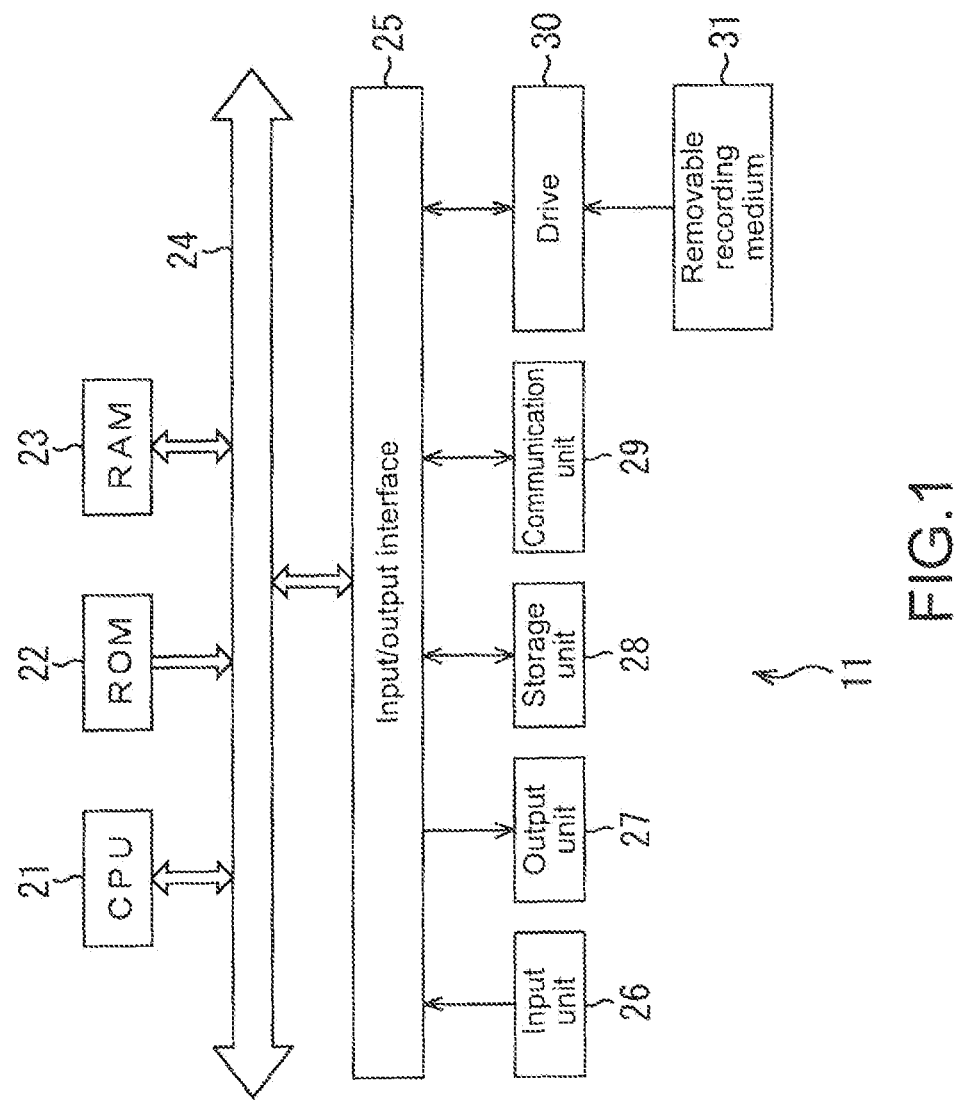
FIG. 1 is a view showing a configuration example of an information processing apparatus to which an embodiment of the present disclosure is applied.

FIG. 1 is a view showing a configuration example of an information processing apparatus to which an embodiment of the present disclosure is applied.

In an information processing apparatus 11, a central processing unit (CPU) 21, a read only memory (ROM) 22, and a random access memory (RAM) 23 are connected to one another via a bus 24.

To the bus 24, further connected is an input/output interface 25. To the input/output interface 25, connected are an input unit 26, an output unit 27, a storage unit 28, a communication unit 29, and a drive 30.

The input unit 26 includes a keyboard, a mouse, microphones, and the like. The output unit 27 includes a display, a speaker, and the like. The storage unit 28 includes a hard disk, a non-volatile memory, and the like. The communication unit 29 includes a network interface and the like.

The drive 30 drives a removable recording medium 31 such as a magnetic disc, an optical disc, a magnetooptical disc, and a semiconductor memory, to recode data or to delete data recorded on the removable recording medium 31. The removable recording medium 31 may be configured as a single cartridge including twelve optical discs, for example.

In the thus configured information processing apparatus 11, the CPU 21 loads a program stored in the storage unit 28, for example, via the input/output interface 25 and the bus 24 into the RAM 23 and executes the program. With this, for example, functional blocks in FIG. 2 are configured and predetermined processing is performed.

Note that a hardware configuration of the information processing apparatus 11 is not limited to the example of FIG. 1. The information processing apparatus 11 only needs to at least have a configuration in which a functional configuration in FIG. 2 to be described later is realized.

[Functional Configuration Example of Information Processing Apparatus]

Figure 2:
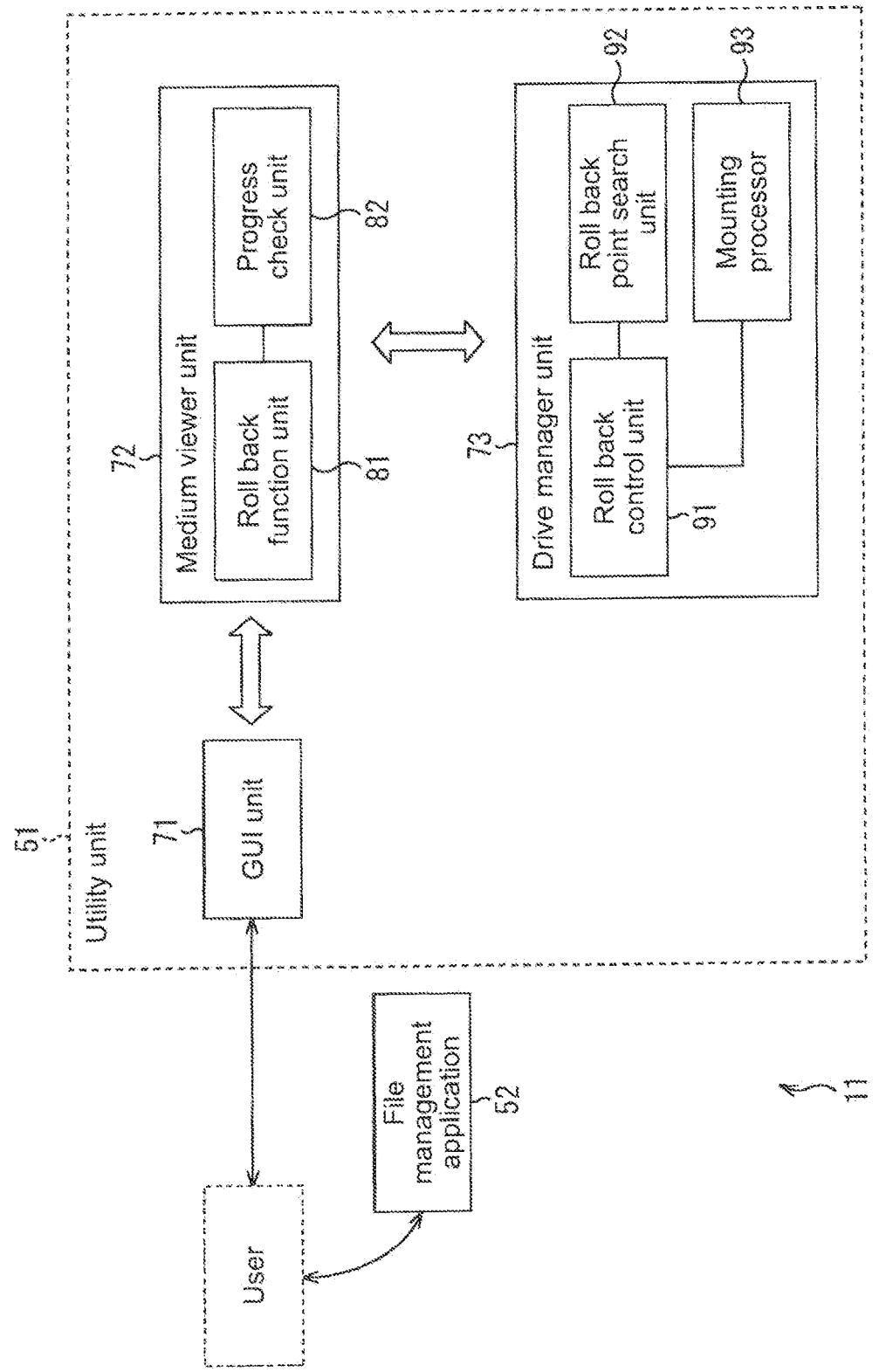
FIG. 2 is a block diagram showing a configuration example of functional blocks of the information processing apparatus.

FIG. 2 is a block diagram showing the functional configuration example of the information processing apparatus.

In the example of FIG. 2, the information processing apparatus 11 is configured to include a utility unit 51 and a file management application 52.

The utility unit 51 is a utility application for rolling back a state of a file system that manages data recorded on the removable recording medium 31 to be mounted on the drive 30. The utility unit 51 is configured to include a graphical user interface (GUI) unit 71, a medium viewer unit 72, and a drive manager unit 73.

The medium viewer unit 72 functions to check a state of the removable recording medium 31 and is configured to include a roll back function unit 81 and a progress check unit 82. The drive manager unit 73 functions to execute roll back processing of the file system on the removable recording medium 31 and is configured by a roll back control unit 91, a roll back point search unit 92, and a mounting processor 93.

The GUI unit 71 supplies an operation signal corresponding to an operation inputted by the user via the keyboard or the mouse constituting the input unit 26 (hereinafter, simply referred to as input unit 26), to the medium viewer unit 72. Further, based on information from the medium viewer unit 72, the GUIT unit 71 generates a screen such as a list or dialogue of roll back points, and displays the generated screen on the display constituting the output unit 27 (hereinafter, simply referred to as output unit 27).

Regarding the roll back function, the roll back function unit 81 intermediates processing between the GUI unit 71 and the drive manager unit 73. That is, the roll back function unit 81 supplies an instruction provided by the user via the GUI unit 71 to the drive manager unit 73, and supplies, in turn, information from the drive manager unit 73 to the GUI unit 71.

The progress check unit 82 supplies information indicating the progress of search for a roll back point by the roll back point search unit 92, and information indicating the progress of mounting processing by the mounting processor 93 to the GUI unit 71. The progress check unit 82 provides such information to the user via the GUI unit 71.

According to an instruction by the roll back function unit 81, the roll back control unit 91 controls the roll back point search unit 92 and the mounting processor 93. The roll back control unit 91 executes the roll back function on the side of the drive 30 and supplies results and situation thereof to the medium viewer unit 72.

Under the control of the roll back control unit 91, the roll back point search unit 92 searches for a plurality of roll back points, and sends progress information of the search results and search processing back to the roll back control unit 91.

The mounting processor 93 executes read-only mounting processing (provisional mounting processing) and recordable (readable and writable) mounting processing with respect to the removable recording medium 31 to be mounted on the drive 30. The mounting processor 33 sends a mounting result and progress information of the mounting processing back to the roll back control unit 91.

The file management application 52 is an external application that presents a state of data (i.e., file system) receded on the storage unit 28, the removable recording medium 31, or the like to the user. According to an operation signal corresponding to an operation inputted by the user via the input unit 26, the file management application 52 displays a state of the file system after the removable recording medium 31 is subjected to provisional mounting processing and recordable mounting processing, on the output unit 27.

[Roll Back Processing of Information Processing Apparatus]

Figure 3:
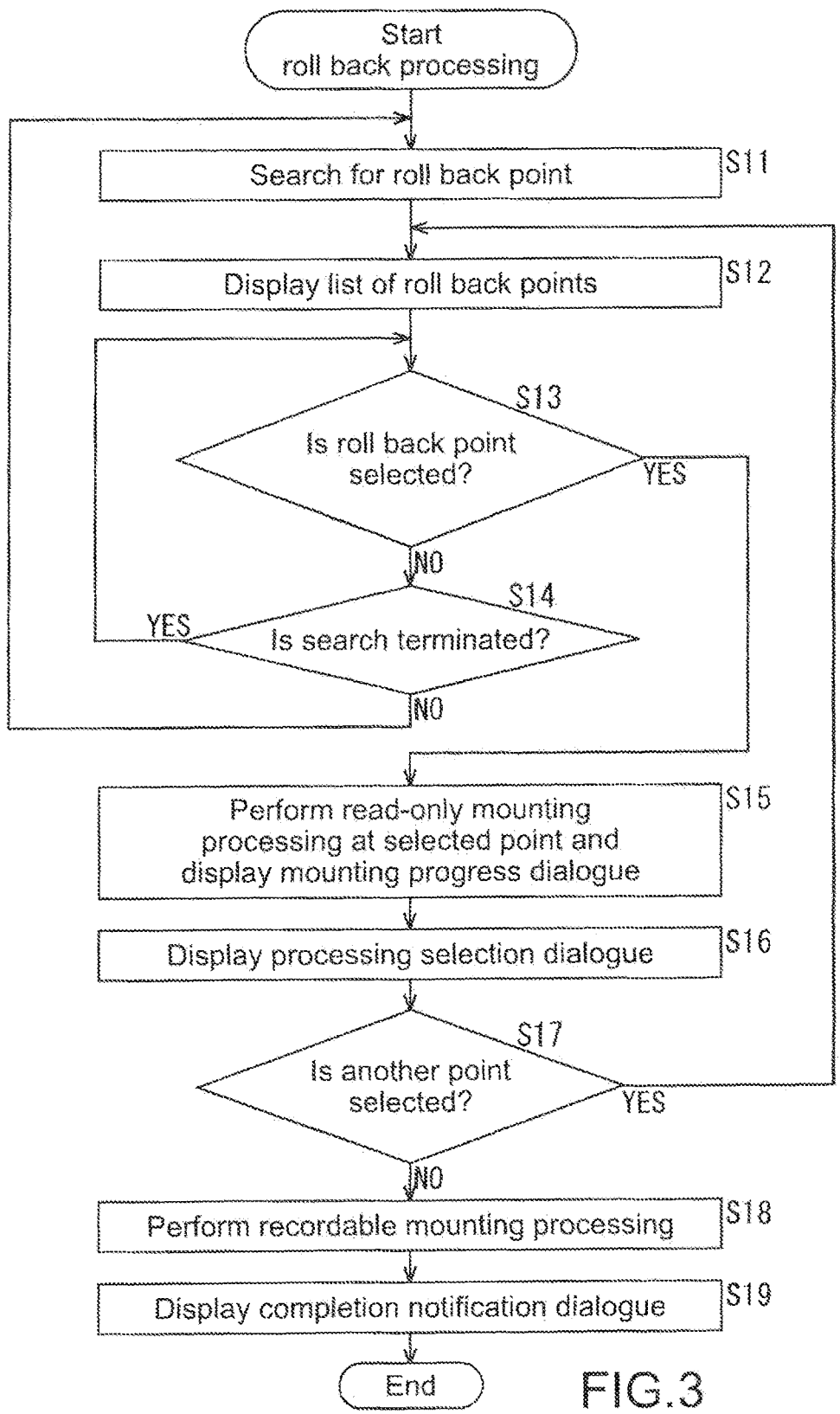
FIG. 3 is a flowchart explaining roll back processing of the information processing apparatus.

Next, referring to a flowchart of FIG. 3, the roll back processing of the information processing apparatus 11 will be described. Note that the list or the dialogue presented to the user in this roll back processing will be described appropriately with reference to FIG. 4.

The user operates the input, unit 26, to thereby instruct the information processing apparatus 11 to start the roll back processing of the file system of the removable recording medium 31. An operation signal corresponding to this operation by the user is supplied to the roll back control unit 91 via the GUI unit 71 and the roll back function unit 81. In Step S11, under the control of the roll back control unit 91, the roll back point search unit 92 searches for a roll back point. Note that this search for the roll back point will be described later in detail with reference to FIG. 13.

A search result thereof is supplied to the GUI unit 71 via the roll back control unit 91 and the roll back function unit 81. In Step 12, the GUI unit 71 generates a list of roll back points and displays the generated list of roll back points on the output unit 27.

In Step 13, the GUI unit 71 determines whether or not a roll back point is selected from the displayed list. If the operation signal of the user from the input unit 26 is not supplied, in Step 13, the GUI unit 71 determines that the roll back point is not selected, and the processing proceeds to Step S14.

In Step 14, the roll back control unit 91 determines whether or not the search by the roll back point search unit 92 is terminated. In Step 14, if the roll back control unit 91 determines that the search is not yet terminated, the processing returns to Step S11 and the subsequent processing is repeated.

In Step 14, if the roll back control unit 91 determines that the search is terminated, the processing returns to Step S13 and the subsequent processing is repeated. That is, in Step S13, the GUI unit 71 stands by until the GUI unit 71 determines that the roll back point is selected. Note that, actually, a cancel button and the like may also be displayed in the list screen. If the cancel button is selected, the roll back processing may be terminated.

Figure 4:
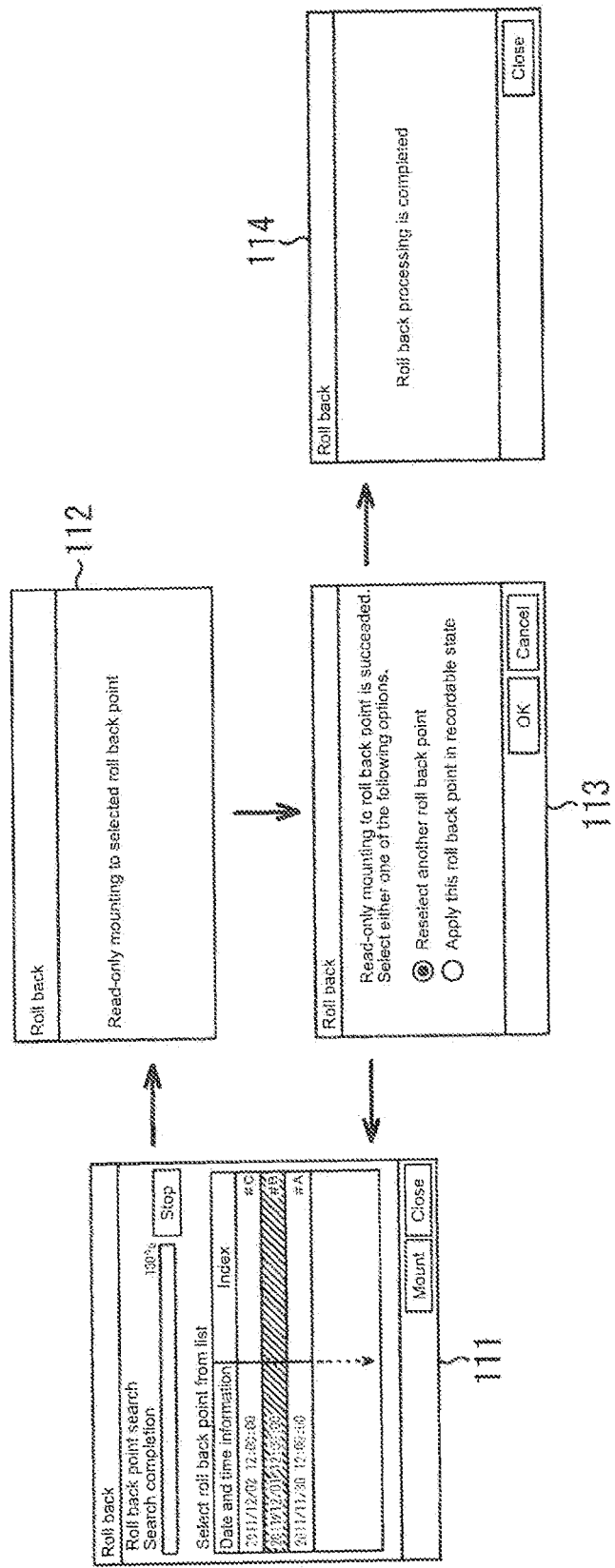
FIG. 4 is a view showing a screen example.

For example, in the display of the list in Step S12, as shown in FIG. 4, a roll back point selection screen 111 showing the list of roll back points is displayed on the output unit 27.

At this time, a progress state of the roll back point search is supplied to the GUI unit 71 via the roll back control unit 91 and the progress check unit 82. Thus, in an upper portion of the roll back point-selection screen 111, the progress state of the roll back point search is displayed.

Further, under the progress state, as the list of roll back points, roll back points of the indexes #A to #C are displayed to be selectable. In the example of FIG. 4, the index #B hatched is selected from those Indexes.

The roll back points of the indexes #C to #A are searched for sequentially from the upper side of the list of roll back points.

The roll back point of the index #C is a roll back point having date and time information of 2011 Dec. 2 12:00:00. The roll back point of the index #B is a roll back point having date and time information of 2011 Dec. 1 12:00:00. The roll back point of the index #A is a roll back point having date and time information of 2011 Nov. 30 12:00:00.

In this manner, in the display of the list of roll back points, the date and time information of the roll back points is displayed. Thus, the user can estimate a desired state of the file system.

Figure 5:
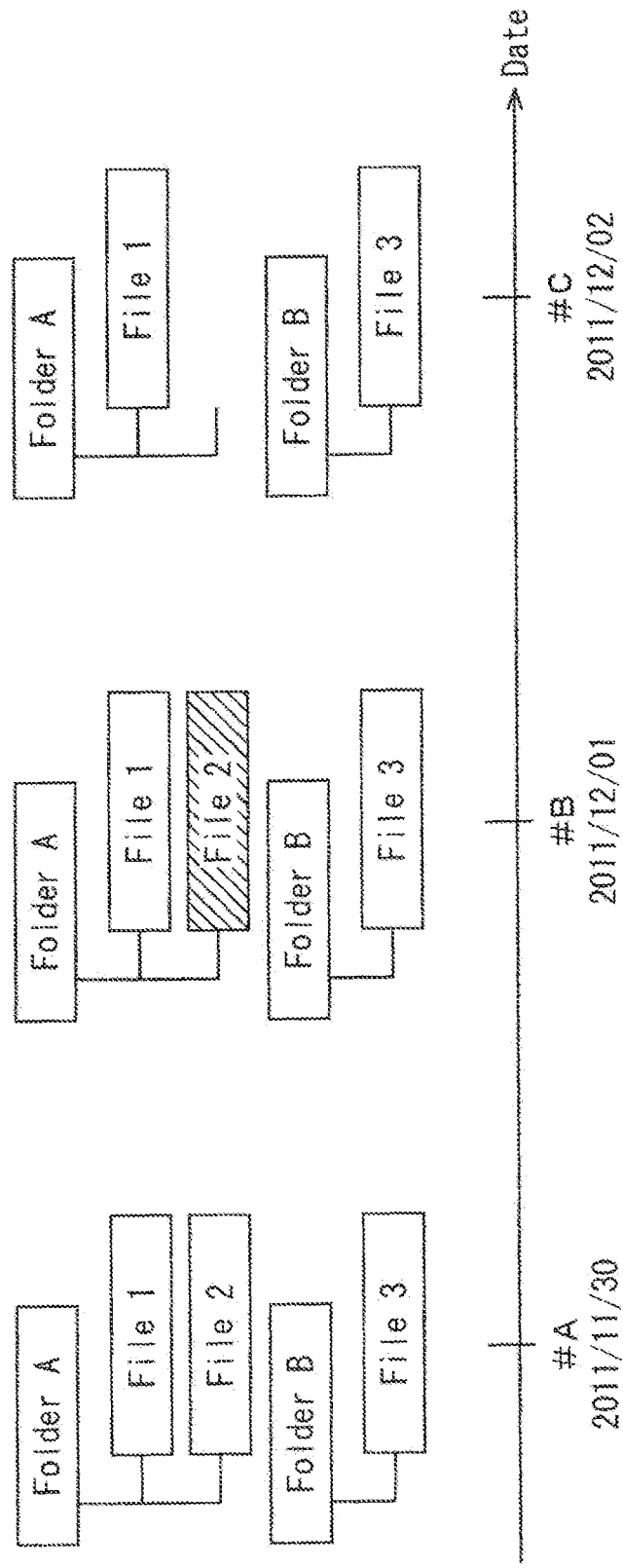
FIG. 5 is a view explaining details of the roll back point.

Now, referring to FIG. 5, the roll back points of the indexes #A to #C will be described in more detail. In the example of FIG. 5, at the roll back point of the index #A, the file system is in a state in which a folder A includes a file 1 and a file 2 and a folder B includes a file 3.

At the roll back point of the index #B, the file system is in a state in which the folder A includes the file 1 and the file 2 and the folder B includes the file 3. Note that the hatched file 2 shows that it is updated from the state of the roll back point of the index #A.

At the roll back point of the index #C, the file system is in a state in which the folder A includes the file 1 and the folder 3 includes the file 3. That is, in the state of the roll back point of the index #C, it can be seen, that the file 2 is deleted from the state of the roll back point of the index #B.

For example, the user has erroneously deleted the file 2 at the data and time of the roll back point of the index #C and desires to return the state of the file system to a state of the roll back point of the index #B.

In this case, the user operates the input unit 26, to thereby select the roll back point of the index #B from the list of roll back points in the roll back, point selection screen 111.

An operation signal corresponding to the operation made by the user with respect to the input, unit 26 is inputted into the GUI unit 71. In Step 13, according to this operation signal, the GUI unit 71 determines that the roll back point is selected, and supplies information on the selected roll back point to the roll back control unit 91 via the roll back function unit 81. The processing proceeds to Step S15.

In Step 15, under the control of the roll back control unit 91, the mounting processor 93 performs read-only mounting processing with respect to the removable recording medium 31 at the selected roll back point. At this time, a mounting progress dialogue 112 in FIG. 4 is displayed on the output unit 27.

That is, while the mounting processor 93 is performing the mounting processing, the progress information of the mounting processing is supplied to the GUI unit 71 via the roll back control unit 91 and the progress check unit 82. Correspondingly, for example, as shown in the example of FIG. 4, the GUI unit 71 displays, on the output, unit 27, the mounting progress dialogue 112 saying to the user "Read-only mounting to selected roll back point."

Further, when the mounting processor 93 terminates the read-only mounting processing, a processing result thereof is supplied to the GUI unit 71 via the roll back control unit 91 and the progress check unit 82. Correspondingly, in Step 16, the GUI unit 71 displays a processing selection dialogue 113 shown in the example of FIG. 4.

In the example of FIG. 4, the processing selection dialogue 113 shows a notification of the processing result and a message promoting a processing selection of "Read-only mounting to roll back point is succeeded. Select either one of the following options." In the bottom of that message, radio buttons for the user to select whether to reselect another roll back point or whether to apply the roll back point on which the mounting processing is terminated in a recordable state are displayed.

Note that, although the read-only mounting processing will be described later in detail with reference to FIG. 10, when the read-only mounting processing by the mounting processor 93 is completed, reading of the state of the file system at the selected roll back point becomes possible. That is, using the file management application 52, the state of the file system after the read-only mounting processing can, be checked.

The user operates the input unit 26, to thereby check the state of the file system after the read-only mounting processing by the file management application 52. At this time, the file management application 52 reads the state of the file system at the roll back point #B in FIG. 5.

That the user checks the state of the file system of the roll back point #B by viewing the state of the file displayed on the output unit 27, and desires to return not to the state of the roll back point #B but to the state of the roll back point #A. In this case, the user operates the input unit 26, to thereby select the roll back point of the index #A from the list of roll back points in the roll back point, selection screen 111.

An operation signal corresponding to the operation made by the user with respect to the input unit 26 is inputted into the GUI unit 71. According to this operation signal, in Step 17, the GUI unit 71 determines whether or not another roll back point is selected. If the user selects the roll back point of the index #A, in Step 17, the GUI unit 71 determines that the other roll back point is selected. The processing returns to Step S12 and the subsequent processing is repeated.

On the other hand, if the file system after the read-only mounting processing is desired, the user operates the input unit 26, to thereby select to apply the roll back point on which the read-only mounting processing is terminated in a recordable state. Correspondingly, in Step 17, the GUI unit 71 determines that the other roll back point, is not selected, and supplies a signal indicating a start of recordable mounting processing to the roll back control unit 91 via the roll back function unit 81. The processing proceeds to Step S18.

In Step 18, under the control of the roll back control unit 91, the mounting processor 93 subjects the removable recording medium 31 to recordable mounting processing at the roll back point of the index #B on which the read-only mounting is completed. Note that the recordable mounting processing will be described later in detail with reference to FIG. 11.

When the recordable mounting processing by the mounting processor 93 is completed, a processing result thereof is supplied to the GUI unit 71 via the roll back control unit 91 and the roll back function, unit 81. Correspondingly, in Step 19, as shown in FIG. 4, the GUI unit 71 displays, on the output unit 27, a completion notification dialogue 114 for notifying of the completion of the roll back, processing. After Step S19, the roll back processing by the information processing apparatus 11 is terminated.

As described above, the plurality of roll back points are searched for and displayed as a list together with the date and time information, and hence the user can estimate, based on the date and time of each of the roll back points, the state of the file system that is desired by the user.

Further, at the roll back point corresponding to the operation made by the user, provisional mounting processing to the read-only state is performed, such that the roll back result can be checked.

With this, even if the user does not know a state of the file system desired by the user, the user can check a provisional state of the file system based on the roll back point. Thus, the user can understand the desired state of the file system.

In addition, after checking the provisional state of the file system, if the provisional state is different from the desired state, the user can reselect another roll back point and check a provisional state of the file system at the other roll back point.

That is, the user can roll back the file system to a desired roll back point.

[Roll Back Processing in Case of UDF]

Next, referring to FIGS. 6 to 11, the roll back processing on the removable recording medium 31 formatted in a universal disk format (UDF) will be described.

Figure 6:
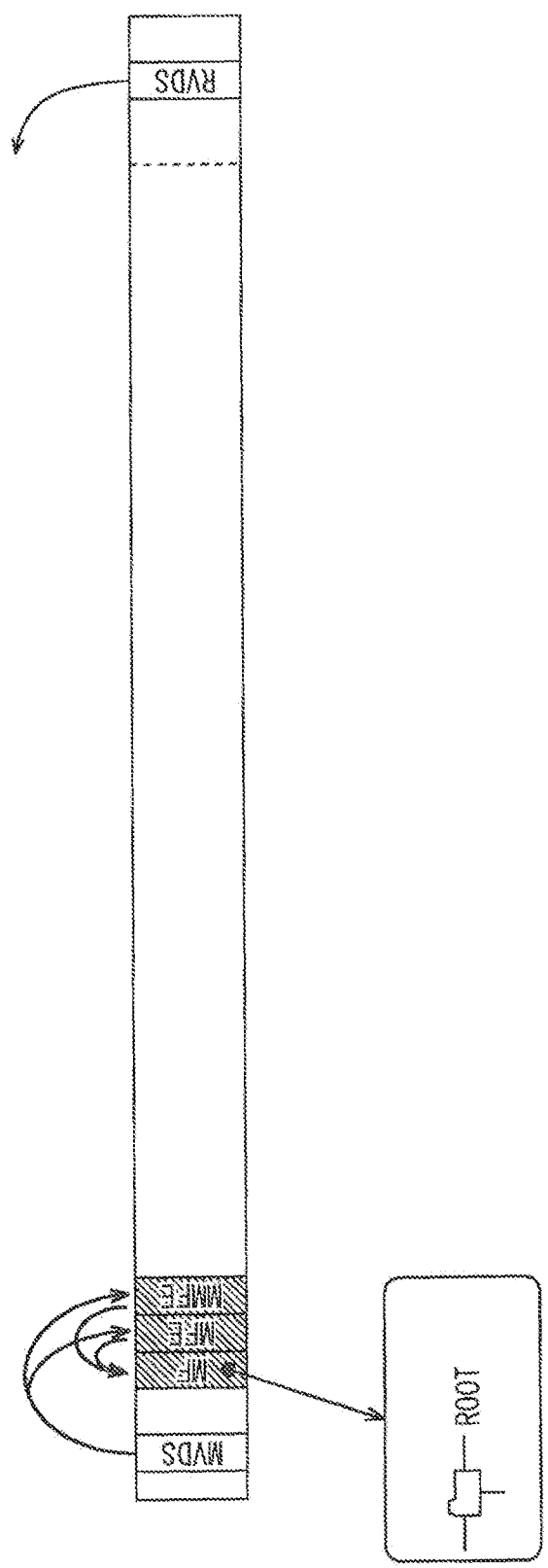
FIG. 6 is a view explaining an initial state of recording of data on a removable recording medium.

The example of FIG. 6 shows an initial state (initial recording state) of data on the removable recording medium 31 formatted in the UDF.

On an inner peripheral side (left in figure) of the removable recording medium 31, a main volume descriptor sequence (MVDS) being volume management information is provided. The MVDS also includes information indicating where the MFE and the MMFE are.

On an outer peripheral side (right in figure) of the removable recording medium 31, the same information as the MVDS is provided as a reserve volume descriptor-sequence (RVDS) for redundancy.

With a predetermined space from the MVDS, next provided is a metadata, file (MF) being file system information stored in a directory structure.

Immediately after the MF, a metadata file entry (MFE) being management information of a metadata file is provided. In addition, immediately after the MFE, for redundancy, the same information as the MFE is provided as a metadata mirror file entry (MMFE).

Note that, in each of the examples of FIGS. 6 to 11, hatched MF, MFE, and MMFE indicate active MF, MFE, and MMFE being currently referred to from the MDVS. In contrast, unhatched MF, MFE, and MMFE indicate MF, MFE, and MMFE being not currently active (inactive). Further, in the examples of FIGS. 6 to 11, the arrows indicate reference relationships.

Figure 7:
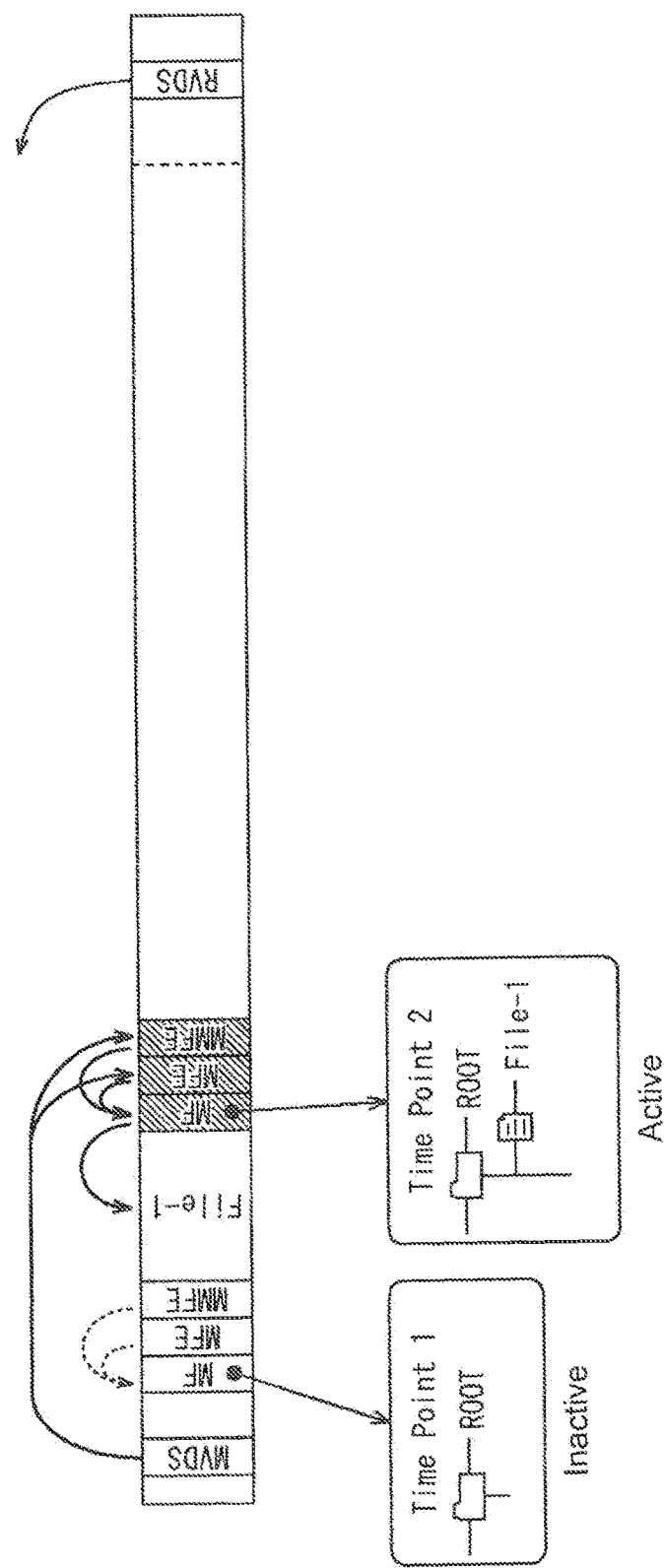
FIG. 7 is a view showing a recording state after recording File-1 in the data on the removable recording medium.

FIG. 7 is a view showing a recording state after recording File-1.

In the example of FIG. 7, File-1 is recorded immediately after the MF, the MFE, and the MMFE of the initial state (time point 1) of FIG. 6. Then, the MF, the MFE, and the MMFE after recording File-1 are generated, and the generated MF, MFE, and MMFE are arranged immediately after File-1 as the MF, the MFE, and the MMFE at a time point 2.

At this time, by recording File-1, the MVDS indicates the MF, the MFE, and the MMFE at the time point 2. Thus, the MF, the MFE, and the MMFE at the time point 1 become inactive, and the MF, the MFE, and the MMFE at the time point 2 become active.

Figure 8:
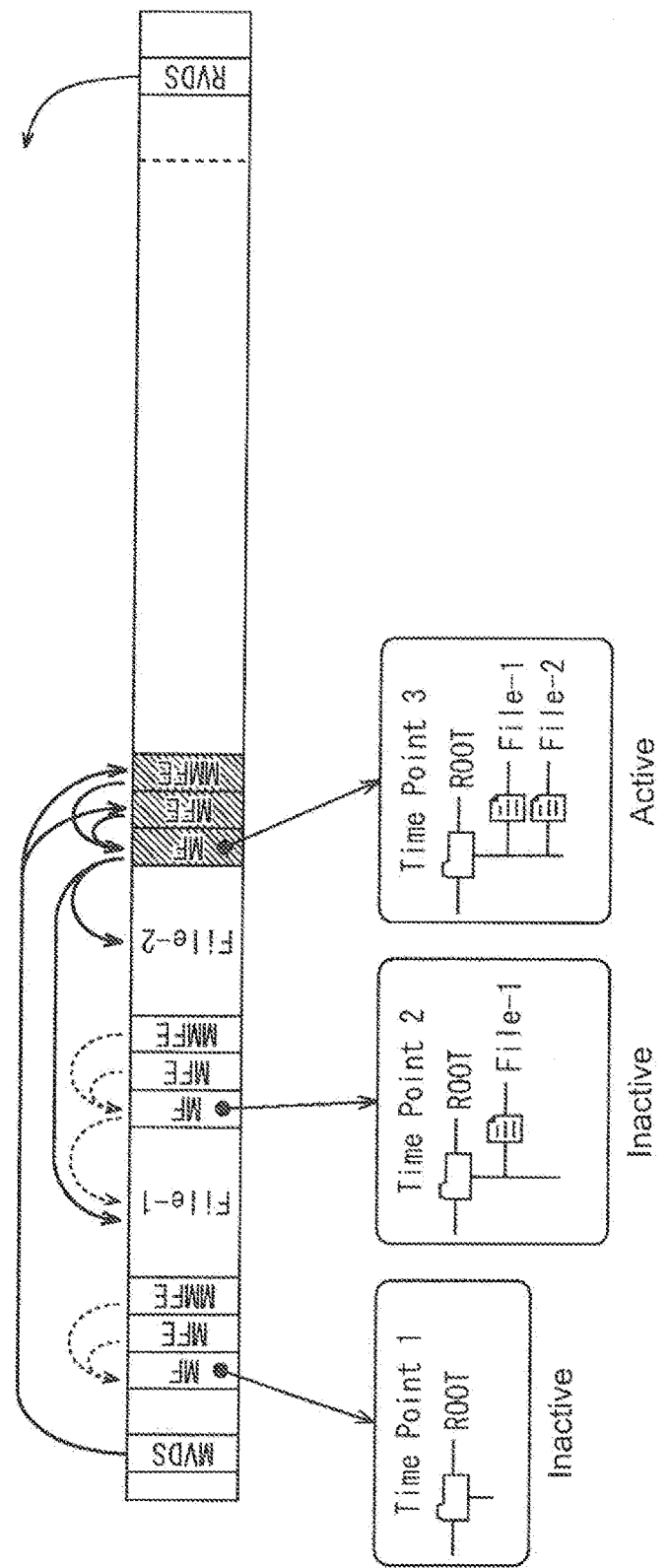
FIG. 8 is a view showing a recording state after recording File-2 in the data on the removable recording medium.

FIG. 8 is a view showing a recording state after recording File-2.

In the example of FIG. 8, immediately after the MF, the MFE, and the MMFE at the time point 2 in FIG. 7, File-2 is recorded. Then, the MF, the MFE, and the MMFE after recording File-2 are generated, and the generated MF, MFE, and MMFE are arranged immediately after File-2 as the MF, the MFE, and the MMFE at a time point 3.

At this time, by recording File-2, the MVDS indicates the MF, the MFE, and the MMFE at the time point 3. Thus, the MF, the MFE, and the MMFE at the time point 2 become inactive, and the MF, the MFE, and the MMFE at the time point 3 become active.

Figure 9:
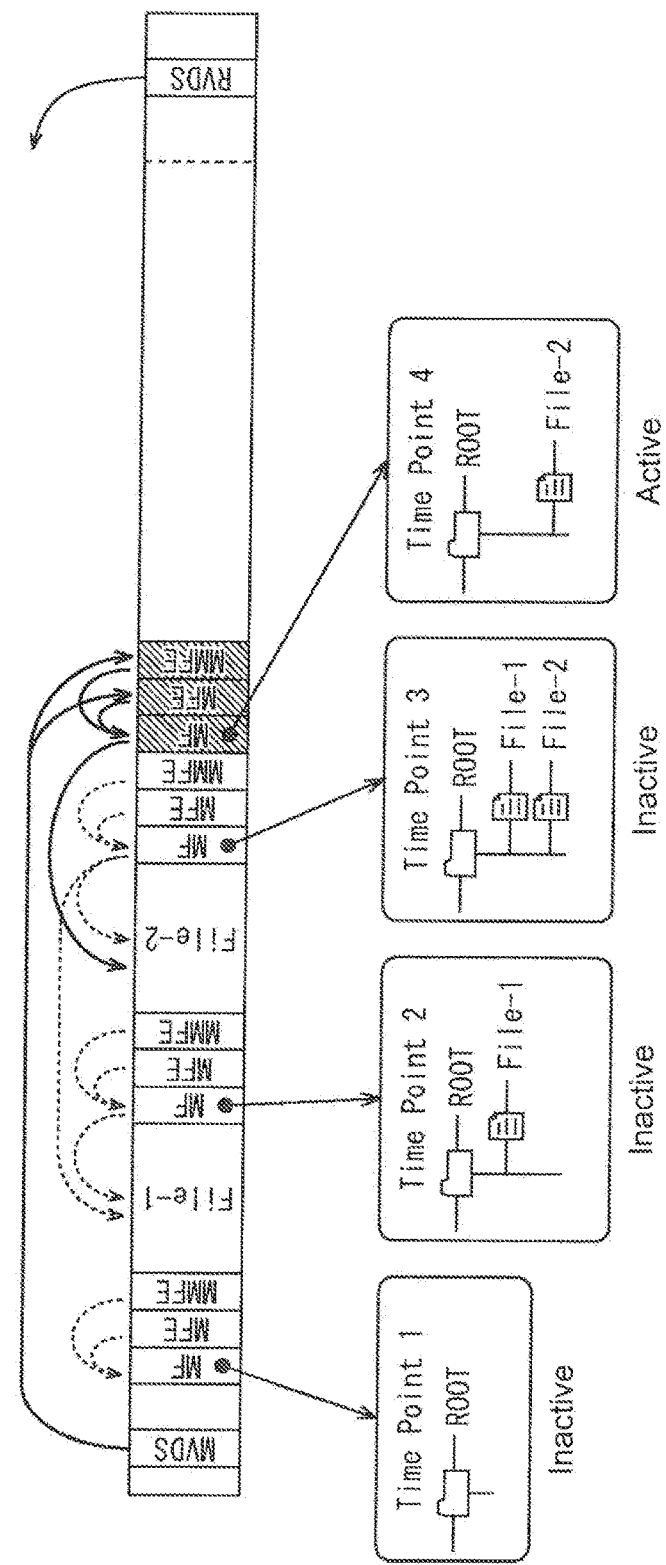
FIG. 9 is a view showing a recording state after deleting File-1 in the data on the removable recording medium.

FIG. 9 is a view showing a recording state after deleting File-1.

In the example of FIG. 9, the MF, the MFE, and the MMFE indicating that File-1 is deleted are generated. The generated MF, MFE, and MMFS are arranged immediately after the MF, the MFE, and the MMFE at the time point 3 in FIG. 8 as the MF, the MFE, and the MMFE at a time point 4.

At this time, by deleting File-1, the MVDS indicates the MF, the MFE, and the MMFE at the time point 4. Thus, the MF, the MFE, and the MMFE at the time point 3 become inactive, and the MF, the MFE, and the MMFE at the time point 4 become active.

Figure 10:
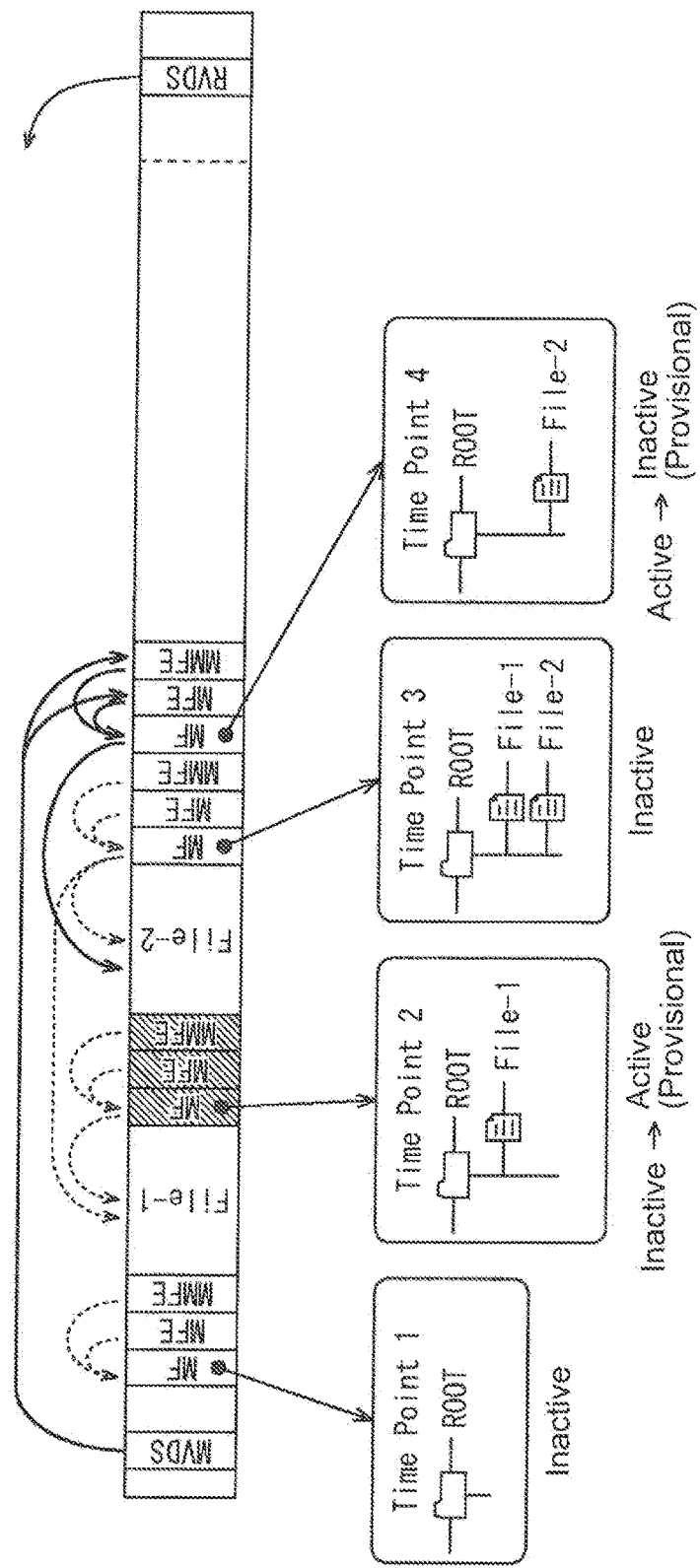
FIG. 10 is a view showing a state after a read-only roll back is performed.

FIG. 10 is a view showing a state in which the read-only roll back (mounting) processing to the state at the time point 2 is performed.

In the example of FIG. 10, by the read-only mounting processing to the state at the time point 2, the MP, the MFE, and the MMFE at the time point 4 become provisionally inactive, and the MF, the MFE, and the MMFE at the time point 2 become provisionally active. That is, the MVDS still indicates the MF, the MFE, and the MMFE at the time point 4. However, due to the read-only mounting processing, the mounting processor 33 indicates the MF, the MFE, and the MMFE at the time point 2. Thus, for actually reading data, file system data of the MF, the MFE, and the MMFE at the time point 2 is read and used.

Figure 11:
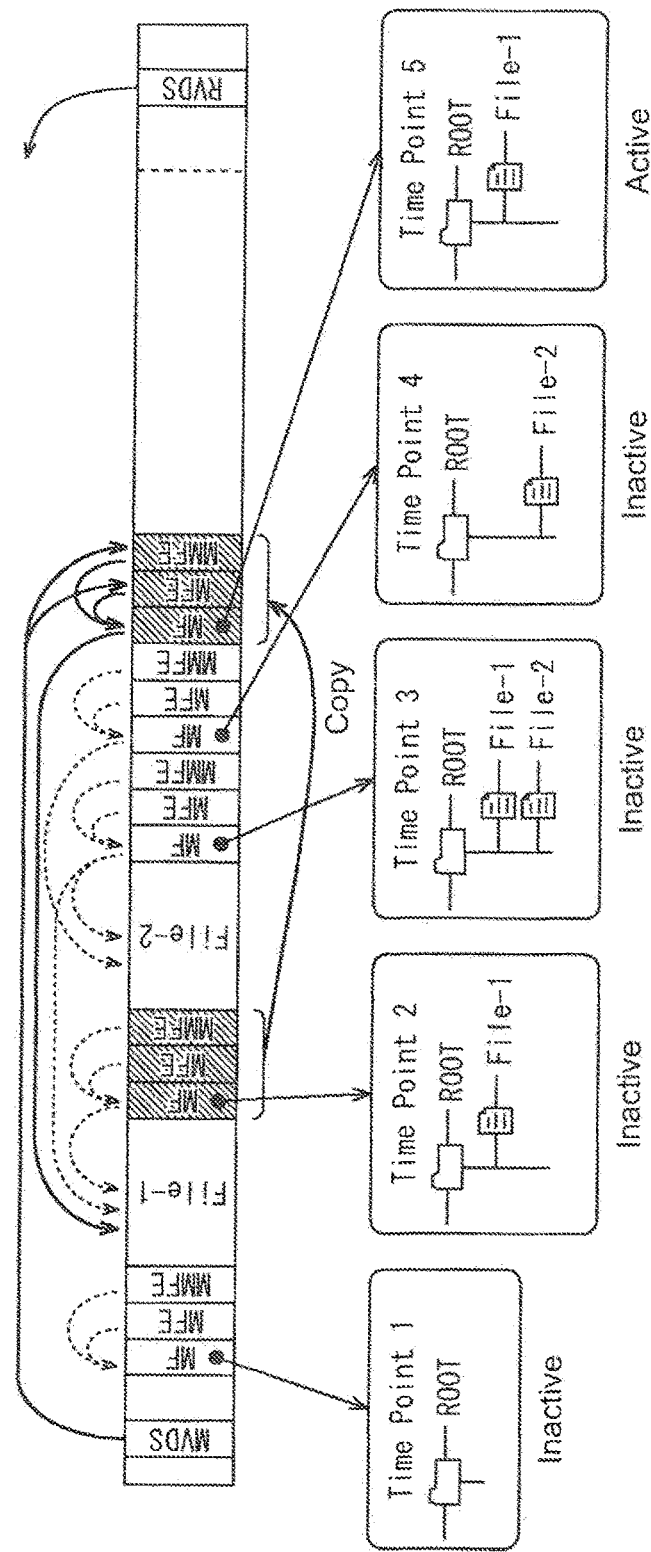
FIG. 11 is a view showing a state in which recordable roll back (mounting) processing is performed.

FIG. 11 is a view showing a state in which recordable roll back (mounting) processing to the state at the time point 2 is performed.

In the example of FIG. 11, the recordable mounting processing is performed from the state in FIG. 10, and hence the MP, the MFE, and the MMFE at a time point 5 are arranged after the MF, the MFE, and the MMFE at the time point 4. The MF, the MFE, and the MMFE at the time point 5 are those generated by copying the MF, the MFE, and the MMFE at the time point 2.

That is, information on the time point 5 is reconstructed based on the information on the time point 2, and arranged after the information on the time point 4.

At this time, due to the recordable roll back, the MVDS indicates the MF, the MFE, and the MMFE at the time point 5. Thus, the MF, the MFE, and the MMFE at the time point 4 become inactive, and the MF, the MFE, and the MMFE at the time point 5 become active.

As described above, in the information processing apparatus 11, in the case of the UDF, the read-only mounting processing is performed in the above-mentioned manner, and then, the roll back enabling the recordable mounting processing to be performed is realized.

With this configuration, the user can check the file at the selected roll back point, and hence the roll back processing satisfactory for the user can be performed.

[Method of Searching for Roll Back Point]

Figure 12:
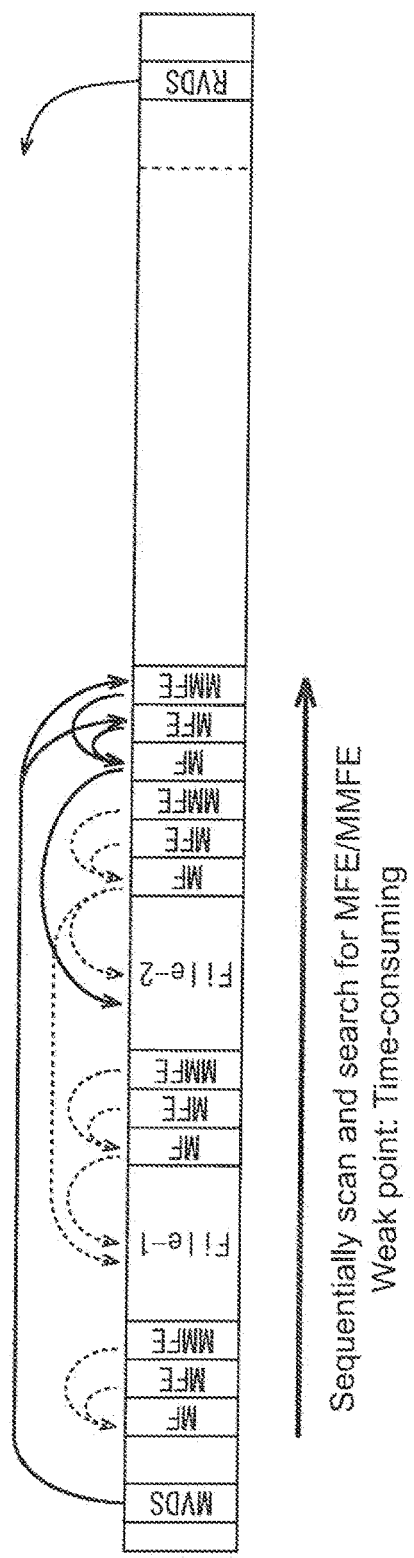
FIG. 12 is a view showing a traditional method of searching for a roll back point.
Figure 13:
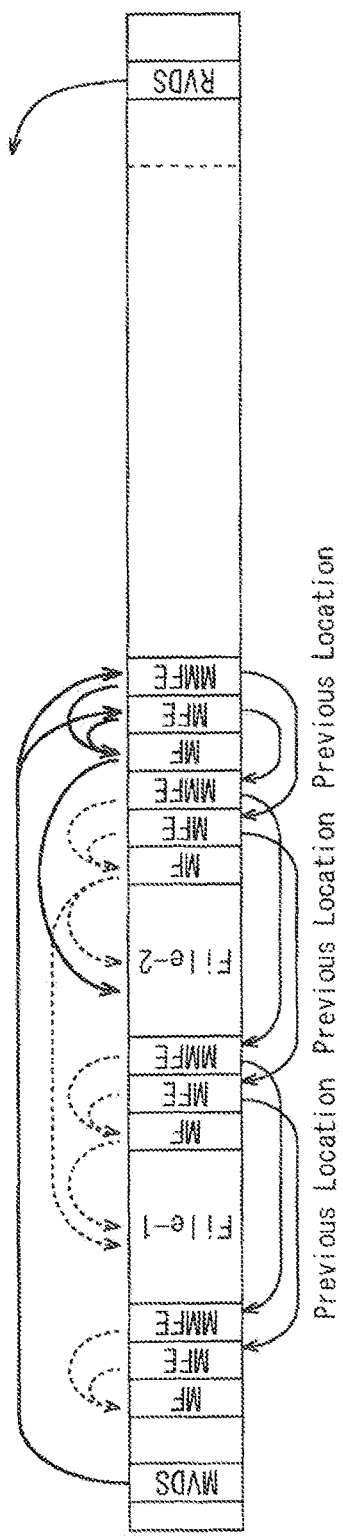
FIG. 13 is a view showing a method of searching for a roll back point according to the embodiment of the present disclosure.

FIG. 12 is a view showing a traditional method of searching for a roll back point. FIG. 13 is a view showing a method of searching for a roll back point according to the embodiment of the present disclosure.

In the example of FIG. 12, the above-mentioned state of the file system in FIG. 9 is shown. In related art, the MFE and the MMFE are searched for by sequentially scanning them from the inner peripheral side (left in figure) of the removable recording medium 31. Therefore, it takes a long time to search for the roll back point.

In contrast, as shown in FIG. 13, in the information processing apparatus 11, upon recording of the MFE and the MMFE, information (Previous Location information in figure) indicating a location (address) of immediately previous MFE and MMFE is recorded in the information of the MFE and the MMFE.

Then, when the roll back point is searched for, that is, the MFE and the MMFE are searched for, Previous Location information embedded in the information of the MFE and the MMFE is used. For example, first, based on the Previous Location information embedded in the information of the MFE and the MMFE, the roll back point is searched, for, sequentially tracking the immediately previous MFE and MMFE from the MFE and the MMFE indicated by MVDS (RVDS) (i.e., being currently active).

With this configuration, it is possible to reduce a time for searching for a roll back point. That is, the roll back search can be performed at high speed.

Next, referring to FIG. 14, a method of embedding Previous Location information will be described. FIG. 14 shows the structure of the MFE and the MMFE defined by the UDF. Note that numerals on a left-hand side are for the sake of description and not associated with contents.

Extension information can be optionally embedded in a field of Extended Attributes shown in 25th line. In view of this, information indicating an address of the immediately previous MFE and MMFE, that is, the Previous Location information is embedded (written) in this field.

Note that the number of bytes of the embedded Extended Attributes can be specified by Length of Extended Attributes shown in 23rd line.

As described above, a plurality of roll back points are searched for. The file system is put in a provisional state (read-only state) at a roll back point selected by the user. Then, according to an operation of the user, the file system is actually put in a writable state.

With this, the user can realize a roll back to a desired point.

Further, for example, when a roll back is performed for changing the state of the file system, if the user erroneously performs mounting to an unintended roll back point, the user may not return to an original file system. There is a fear that the data may be lost or the capacity of the medium may be wasted.

In the case of a write once (WO) medium, if recordable mounting is performed, the capacity of the medium is used for transition to the state of the file system selected by the user. Thus, if the user makes an erroneous operation, the capacity of the medium is wasted.

In the case of a rewritable (RE) medium, a roll back can be performed after the capacity is restored. In this roll back, the medium capacity corresponding to the amount of return is restored for transition to the state of the file system selected by the user. That is, the state of the file, system that had been present in the restored portion cannot be regained.

When such an irrecoverable operation is made, according to the embodiment of the present disclosure, it is possible to assist in reliably returning to the state of the file system desired by the user.

In addition, according to the embodiment of the present disclosure, it is possible to perform the roll back search at high speed.

Although the case of the UDF has been described above as one of embodiments, the present disclosure is not limited to the UDF. The embodiment of the present disclosure may be applied also to another file system.

The above-mentioned series of processing may be executed by not only hardware but also software. In the case of executing the series of processing by software, a program making up the software is installed into a computer. Here, the computer includes a computer embedded in dedicated hardware, and, for example, a general-used personal computer capable of executing various functions by installing various programs.

In this case, the program executed by the computer (CPU 21) in FIG. 1 may be provided being recorded on the removable recording medium 31 as a package medium, for example. Further, the program may be provided via a wired or wireless transmission medium such as a local area network, the Internet, and digital satellite broadcasting.

In the computer, by mounting the removable recording medium 31 on the drive 30, the program may be installed into the storage unit 28 via the input/output interface 25. Further, the program may be received by the communication unit 29 via a wired or wireless transmission medium and installed into the storage unit 28. Otherwise, the program may be installed into the ROM 22 or the storage unit 28 in advance.

Note that the program executed by the computer may be a program in which processing is chronologically performed in the order described herein or may be a program in which processing is performed in parallel or at a necessary timing, for example, upon calling.

Note that, herein, the steps describing the above-mentioned sequence of processing, of course, include processing chronologically performed in the described order. However, the processing does not necessarily need to be chronologically performed. The steps also include processing executed, in parallel or individually.

Further, embodiments of the present disclosure are not limited to the above-mentioned embodiment, and various changes may be made, without departing from the gist of the present disclosure.

For example, the embodiment of the present disclosure may take a cloud computing configuration in which a single function is shared and commonly processed by a plurality of apparatuses over a network.

Further, each of the steps described in the above-mentioned flowchart may be shared and executed by a plurality of apparatuses instead of being executed by a single apparatus.

In addition, if a single step includes a plurality of types of processing, the plurality of types of processing included in the single step may be shared and executed by a plurality of apparatuses instead of being executed by a single apparatus.

Alternatively, the configuration described above as a single apparatus (or processing unit) may be divided and configured as a plurality of apparatuses (or processing units). In contrast, the configurations described above as a plurality of apparatuses (or processing units) may be collectively configured as a single apparatus (or processing unit). Alternatively, of course, the configuration other than those described above may be added to the configuration of each apparatus (or each processing unit). In addition, as long as the configuration and the operation as the entire system are substantially the same, part of the configuration of a certain apparatus (or processing unit) may be included in the configuration of another apparatus (or another processing unit). That is, the embodiments of the present disclosure are not limited to the above-mentioned embodiment and can be variously changed without departing from the gist of the present disclosure.

Although the favorable embodiment of the present disclosure has been described in detail with reference to the attached drawings, the present disclosure is not limited to such examples. It should be understood by those having ordinary knowledge in the art to which the present disclosure pertains that it is clear that various variants and modifications can be achieved within the technical concept described in the scope of claims, which also belong to the technical range of the present disclosure, of course.

It should be noted that the present, disclosure may also take the following configurations.

(1) An information processing apparatus, including:
a search unit configured to search for a plurality of roll back points of a file system;
a selection unit configured to select, from the plurality of roll back points searched for by the search unit, a roll back point corresponding to an operation made by a user; and
a mounting processor configured to mount the file system at the roll back point selected by the selection unit to a read-only state, and further mount the file system to a readable and writable state according to an operation made by the user.

(2) The information processing apparatus according to Item (1), in which
the mounting processor is configured to mount the file system at the roll back point selected by the selection unit to the read-only state, and further mount, if the selection unit selects another roll back point corresponding to an operation made by the user, the file system at the other roll back point selected by the selection unit to the read-only state.

(3) The information processing apparatus according to Item (1) or (2), in which
the mounting processor is configured to use management information of a file at the roll back point selected by the selection unit, to thereby mount the file system at the roll back point, selected by the selection unit to the read-only state.

(4) The information processing apparatus according to any one of Items (1) to (3), in which
the mounting processor is configured to reconstruct, based on the management information of the file at the roll back point selected by the selection unit, management information of a file being currently referred to, to thereby mount the file system at the roll back point selected by the selection unit to the readable and writable state.

(5) The information processing apparatus according to any one of Items (1) to (4), in which
the search unit is configured to, sequentially from management information of a file being currently referred to, search for the roll back point based on information indicating a location of management information of an immediately previous file, the information being embedded in the management information of the file.

(6) The information processing apparatus according to any one of Items (1) to (5), in which
the file system includes universal disk format (UDF).

(7) An information, processing method for an information processing apparatus, the method including;
searching for a plurality of roll back points of a file system;
selecting, from the plurality of roll back points searched for, a roll back point corresponding to an operation made by a user; and
mounting the file system at the selected roll back point to a read-only state, and further mounting the file system to a readable and writable state according to an operation made by the user.

(8) A program that causes a computer to function as:
a search unit configured to search for a plurality of roll back points of a file system;
a selection unit configured to select, from the plurality of roll back points searched for by the search unit, a roll back point corresponding to an operation made by a user; and
a mounting processor configured to mount the file system at the roll back point selected by the selection unit to a read-only state, and further mount the file system to a readable and writable state according to an operation made by the user.

It should be understood by those skilled in the art that various modifications, combinations, sub-combinations and alterations may occur depending on design requirements and other factors insofar as they are within the scope of the recorded claims or the equivalents thereof.

What is claimed is:

1. An information processing apparatus, comprising:
a processor including
a search unit configured to search for a plurality of rollback points of a file system;
a selection unit configured to select, from the plurality of rollback points searched for by the search unit, a rollback point corresponding to an operation made by a user; and
a mounting processor configured to provisionally mount the file system at the rollback point selected by the selection unit to a read-only state for displaying the state of the file system to the user, and further mount the file system from the read-only state to a readable and writable state of the selected rollback point according to another operation made by the user when the user determines the state of the file system is at the desired rollback point after the user views the display of the state of the file system in the read-only state, the file system being provisionally mounted by setting active a metadata file of the rollback point, wherein, each time when a rollback point is generated, the processor is configured to generate a management file for the file system at that rollback point and a mirror file entry of the management file, both the management file and the mirror file entry at a first rollback point including an address of the management file for a second rollback point representing an immediately previous rollback point, the displayed state of the file system indicating changes of the file system of the first rollback point in comparison to the second rollback point, and wherein, when searching for the plurality of the rollback points, the search unit uses the address included in the management file to sequentially track the immediately previous rollback point.

2. The information processing apparatus according to claim 1, wherein the mounting processor is configured to mount the file system at the rollback point selected by the selection unit to the read-only state, and further mount, if the selection unit selects another rollback point corresponding to an operation made by the user, the file system at the other rollback point selected by the selection unit to the read-only state.

3. The information processing apparatus according to claim 2, wherein the mounting processor is configured to use management information of a file at the rollback point selected by the selection unit, to thereby mount the file system at the rollback point selected by the selection unit to the read-only state.

4. The information processing apparatus according to claim 3, wherein the mounting processor is configured to reconstruct, based on the management information of the file at the rollback point selected by the selection unit, management information of a file being currently referred to, to thereby mount the file system at the rollback point selected by the selection unit to the readable and writable state.

5. The information processing apparatus according to claim 1, wherein the file system includes universal disk format (UDF).

6. An information processing method for an information processing apparatus, the method comprising:

searching for a plurality of rollback points of a file system;

selecting, from the plurality of rollback points searched for, a rollback point corresponding to an operation made by a user; and provisionally mounting the file system at the selected rollback point to a read-only state for displaying the state of the file system to the user, and further mounting the file system from the read-only state to a readable and writable state at the selected rollback point according to another operation made by the user when the user determines the state of the file system is at the desired rollback point after the user views the display of the state of the file system in the read-only state, the provisional mounting being implemented by setting active a metadata file of the rollback point, wherein, each time when a rollback point is generated, the method further comprises generating a management file for the file system at that rollback point and a mirror file entry of the management file, both the management file and the mirror the entry at a first rollback point including an address of the management the for a second rollback point representing an immediately previous rollback point, the displayed state of the file system indicating changes of the file system of the first rollback point in comparison to the second rollback point, and wherein, when searching for the plurality of the rollback points, the searching step uses the address included in the management the to sequentially track the immediately previous rollback point.

7. A computer program embodied on a non-transitory computer readable medium that causes a computer to function as:

a search unit configured to search for a plurality of rollback points of a file system;

a selection unit configured to select, from the plurality of rollback points searched for by the search unit, a rollback point corresponding to an operation made by a user; and a mounting processor configured to provisionally mount the file system at the rollback point selected by the selection unit to a read-only state for displaying the state of the file system to the user, and further mount the file system from the read-only state to a readable and writable state according to another operation made by the user when the user determines the state of the file system is at the desired rollback point after the user views the display of the state of the file system in the read-only state, the file system being provisionally mounted by setting active a metadata file of the rollback point, wherein, each time when a rollback point is generated, the computer is configured to generate a management the for the file system at that rollback point and a mirror file entry of the management file, both the management file and the mirror file entry at a first rollback point including an address of the management the for a second rollback point representing an immediately previous rollback point, the displayed state of the file system indicating chances of the file system of the first rollback point in comparison to the second rollback point, and wherein, when searching for the plurality of the rollback points, the search unit uses the address included in the management the to sequentially track the immediately previous rollback point.

* * * * *